United States Patent
Kindo et al.

(10) Patent No.: US 6,961,724 B1
(45) Date of Patent: Nov. 1, 2005

(54) METHOD AND APPARATUS FOR IMAGE RETRIEVAL

(75) Inventors: Toshiki Kindo, Kanagawa (JP);
Hideyuki Yoshida, Kanagawa (JP);
Takehiko Shida, Kanagawa (JP);
Natsuki Oka, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 440 days.

(21) Appl. No.: 09/708,083

(22) Filed: Nov. 8, 2000

(30) Foreign Application Priority Data

Nov. 11, 1999 (JP) .............................. 11-320540

(51) Int. Cl.[7] .............................................. G06F 17/30
(52) U.S. Cl. ........................ 707/4; 707/104.1; 345/968
(58) Field of Search ................... 707/1, 3, 4, 104.1, 707/10, 5; 345/974, 968, 700; 382/305

(56) References Cited

U.S. PATENT DOCUMENTS

| | | | | |
|---|---|---|---|---|
| 5,572,728 A | * | 11/1996 | Tada et al. .................... | 707/200 |
| 5,761,496 A | | 6/1998 | Hattori | |
| 5,761,655 A | * | 6/1998 | Hoffman ......................... | 707/4 |
| 5,778,372 A | * | 7/1998 | Cordell et al. ............... | 707/100 |
| 5,802,361 A | * | 9/1998 | Wang et al. ................... | 707/6 |
| 5,867,177 A | * | 2/1999 | Okuyama et al. ............ | 345/473 |
| 5,913,205 A | * | 6/1999 | Jain et al. ....................... | 707/2 |
| 5,983,237 A | * | 11/1999 | Jain et al. .................. | 707/104.1 |
| 6,012,069 A | * | 1/2000 | Shibazaki .................. | 707/104.1 |
| 6,070,161 A | * | 5/2000 | Higashio .......................... | 707/4 |
| 6,144,968 A | * | 11/2000 | Zellweger ................. | 707/104.1 |
| 6,243,713 B1 | * | 6/2001 | Nelson et al. ............ | 707/104.1 |
| 6,480,837 B1 | * | 11/2002 | Dutta ............................. | 707/3 |

FOREIGN PATENT DOCUMENTS

| | | |
|---|---|---|
| JP | 5-324739 | 12/1993 |
| JP | 07-225772 | 12/1994 |
| JP | 9-006797 | 1/1997 |
| JP | 11-259483 | 9/1998 |
| JP | 11-312115 | 11/1999 |

* cited by examiner

Primary Examiner—Greta Robinson
(74) Attorney, Agent, or Firm—McDermott Will & Emery LLP

(57) ABSTRACT

A method and an apparatus for retrieving images which allows easy retrieval of a desired image from an image database stored in an electronic or optical recording medium or a communication network. As the first step of searching, through the menu entry section, the user enters multi-leveled retrieval requests for the keywords associated with an image. Received the requests, the retrieval section evaluates the user's necessity for the image based on at least the entered requests and the number of the requests. Then the retrieved image is displayed on the screen, according to the calculated necessity. The method and apparatus thus provide the user with a much-needed image in order of precedence by qualifying the user's necessity for the image.

14 Claims, 3 Drawing Sheets

METHOD AND APPARATUS FOR IMAGE RETRIEVAL

FIELD OF THE INVENTION

The present invention relates to an image retrieval method and the apparatus employing the same, by which a desired image can be retrieved easily from an image database stored in a storage device or a communication network.

BACKGROUND OF THE INVENTION

Recent improvements in information technology, typified by the Internet, and well-organized infrastructure have encouraged a widespread use of a vast amount of images. However, it is also true that such diversity of the usage has brought users a difficulty in retrieving a required image correctly and speedy from reams of data.

In a conventional retrieval system, a Boolean equation keyword-aided retrieval, in which keywords associated with logical operators, such as AND, OR are specified as selection criteria, has been commonly used in searching, keywords- or labels-tagged image data. With the system, an image that matches with selection criteria specified keywords associated with the Boolean equations is retrieved from as much as tens of, or even hundreds of thousands of data. In the conventional system described above, however, it is a crucial determinant how the user specifies the selection criteria effectively, using appropriate keywords with the Boolean equation. That is, it is often difficult to obtain desired results or even to set appropriate selection criteria, unless the user is familiar with a tendency of a data group filed in a database or the structure of a retrieval system. To find out a tendency, it may be necessary to understand the keywords of the data group are defined on what kind of conditions. Likewise, to have a good grasp of the structure of a retrieval system, it may be important to be aware whether or not the retrieval system covers thesauruses, to which the entered keywords correspond.

For such reasons, it has often been difficult for a beginner to obtain intended information or distribution.

In addition, in such retrieval system, the obtained result is evaluated for the simple reason that the result matches a Boolean equation with specified keywords. That is, it is often occurred that the result happens to match with the specified keyword and, in reality, the obtained result disappointedly turned to be unwanted one. Interrupted with such inconveniences, it is not easy to select much-needed information for an individual user from long lists of the obtained results in order of precedence.

SUMMARY OF THE INVENTION

The present invention aims to quantify the degree of necessity for the desired image to the user and provides the user with much-needed image in order of precedence.

The image retrieval apparatus of the present invention retrieves a desired image from a communication network or an information-storage medium, such as a magnetic recording medium and an optical recording medium. The apparatus includes:

(1) menu entry section accepting multi-leveled retrieval requests for the keyword tagged to an image;

(2) retrieval section evaluating the degree of necessity for the desired image to the user, using at least the entered requests and the number of the requests in the menu entry section; and (3) image display section displaying the image based on the degree of necessity evaluated in the retrieval section.

With such a structure, the present invention can provide the user with a much-needed image in order of precedence by quantifying the degree of necessity for an individual image.

DESCRIPTION OF THE PREFERRED EMBODIMENTS

The preferred embodiments of the present invention are described hereinafter with reference to the accompanying drawings.

First Preferred Embodiment

Figure 1:
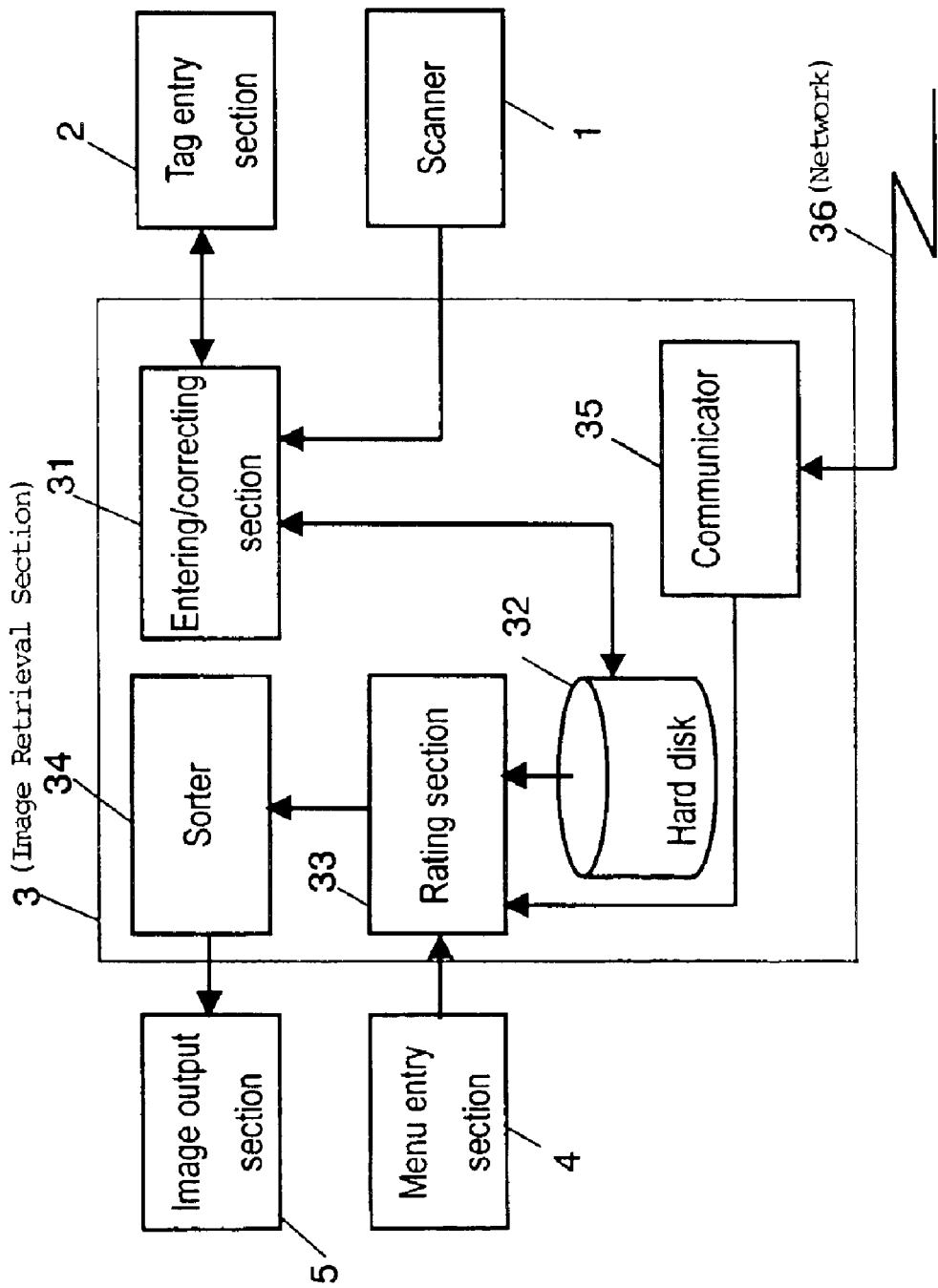
FIG. 1 shows a block diagram, in which arrows indicate the flow of the process, of the image retrieval apparatus of the present invention in accordance with a first preferred embodiment.

The embodiment of the present invention is described hereinafter with reference to the accompanying drawings. FIG. 1 is a block diagram indicative of the structure of the image retrieval apparatus. The explanation below will be described the case in which the apparatus comprises a personal computer and other peripheral devices. Although description referred to input and output sections assumes the case using an internet-browser, similar configuration is also possible even in a game machine having a simple entry function.

In FIG. 1, scanner 1 converts an image into an electronic image signal to store it in an electronic medium. Tag entry section 2 is used for tagging a keyword to the electronic image signal. The user inputs a retrieval request signal in menu entry section 4 in order to search a desired image. Image output section 5 outputs an obtained electronic image signal. In tag section 2, menu entry section 4 and image output section 5, display screens are used for inputting and displaying.

Image retrieval section 3:

(1) stores an electronic image signal and the tag signal from tag entry section 2 into a built-in hard disk;

(2) evaluates a necessity signal for each electronic image signal according to the tag signal, and the retrieval request signal entered via menu entry section 4; and (3) outputs the electronic image signal to image output section 5 such that the image signal with a higher necessity signal comes first.

Image retrieval section 3 includes hard disk 32, entering/correcting section 31, rating section 33, sorter 34, and communicator 35.

Entering/correcting section 31 writes an electronic image signal and a tag signal into hard disk 32, which stores the both signals.

Rating section 33 evaluates a necessity signal indicating the degree of necessity for an image, using the retrieval request signal handed from menu entry section 4, and the tag signal tagging to each electronic image signal stored in hard disk 32.

Sorter 34 sorts the electronic image signals such that the image signal having a higher necessity signal comes first, and outputs the sorted signals to image output section 5. Communicator 35 searches, via network 36, an image from accumulated data in a communication network.

Now will be described the workings of such structured image retrieval apparatus.

When the user converts an image such as an illustration into an electronic image signal with scanner 1, the image signal is set on an address, provided a file name. Then the user starts up the browser installed in his/her PC and selects the image entry page by clicking to start up tag entry section 2. In response to the operation, the browser displays tag entry screen 21 shown in FIG. 2.

When the user selects NEW IMAGE ENTRY in the screen, tag entry section 2 consults entering/correcting section 31 the number which is newly assigned to the electronic image signal to be added. In the embodiment, the already stored image signals have serial numbers from 1, so that the number next to which is given to the previously added image signal will be assigned to the image to be added.

Tag entry section 2 displays image number 26, electronic image signal 22, keywords 24, which are received from entering/correcting section 31, and virtual buttons 25 shown next to each keyword. Here, an original image signal is scaled down and displayed as electronic image signal 22.

Figure 2:
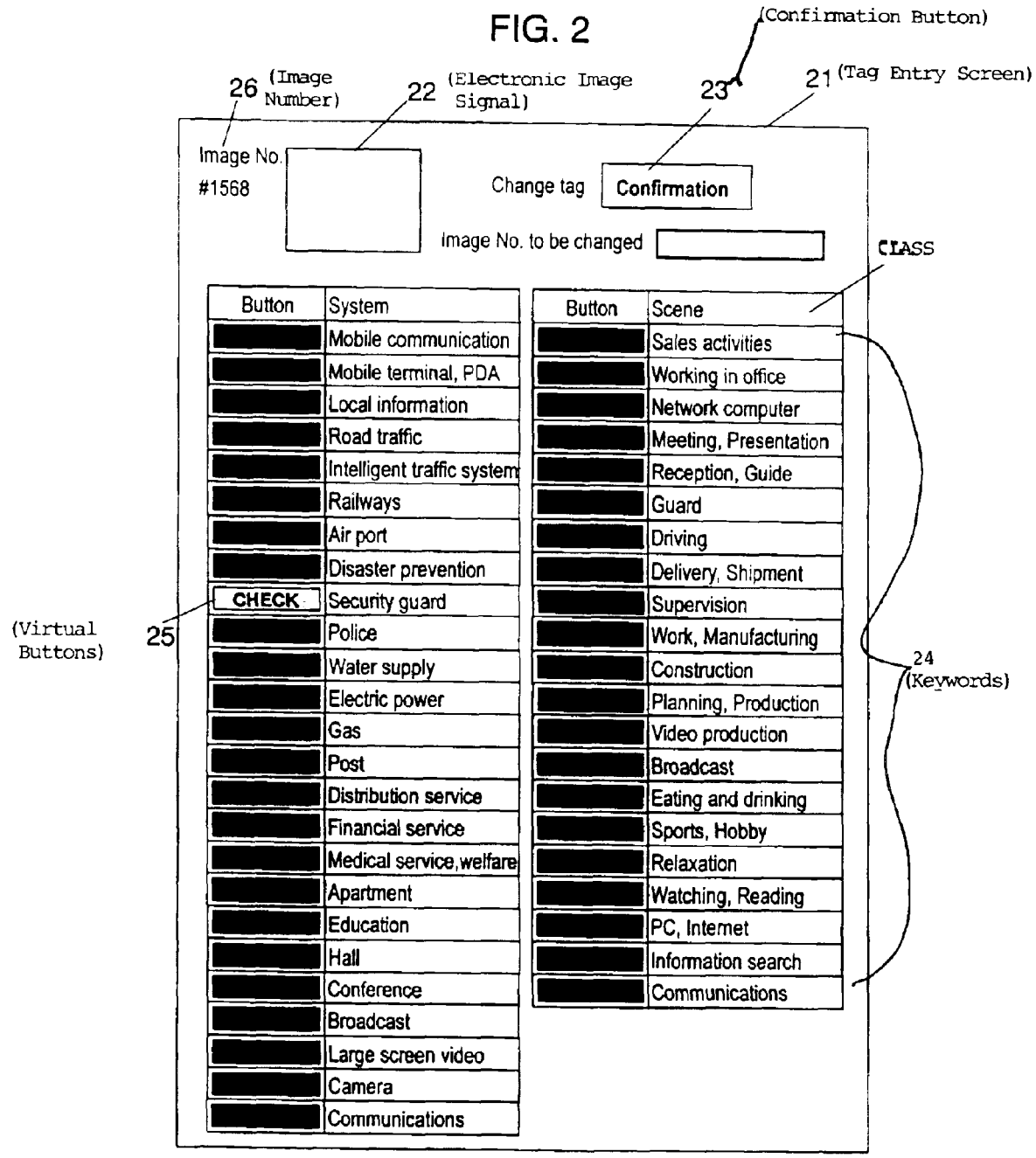
FIG. 2 shows a display of a tag entry section.

The keywords are classified into some groups, for example, in FIG. 2, they are grouped by field, place, and scene. Each class has plural keywords.

The user can click on desired one of virtual buttons 25 in the screen to add a tag signal to the image signal to be entered.

When the user clicks on Confirmation button 23 in the screen, the image signal is stored with the corresponding tag signal into hard disk 32 as a file addressable by a number.

Suppose that tag signal "Tm", which corresponds to the electronic image signal addressed by number "m", has classes in numbers of "Nc". Tag signal "Tm" can be expressed in vectors in numbers of "Nc".

Furthermore, suppose that class "c" has keywords in numbers of "Kc". In this case, each vector of tag signal "Tm" is expressed in "Kc"-dimensional vector, where suppose that the component corresponding to the keyword specified a tag is set to 1, while the component with no tag is set to 0.

For example, tag signal "Tm" is expressed as follows:

$$Tm(c=1)=(0, 0, 1, 0, \ldots, 0, 1)$$

$$Tm(c=2)=(0, 1, 0, \ldots, 0, 1)$$

. . .

$$Tm(c=Nc)=(0, 0, 0, 1, 0, \ldots, 0, 1)$$

When correcting the tag signal tagged to the entered image signal, the user starts up tag entry section 2 as in the case of the entry operation, then selects CORRECTION in the screen. In response to the selection, tag entry section 2 prompts for the assigned number to the electronic image signal stored in hard disk 32. According to the number entered by the user, tag entry section 2 reads, via entering/correcting section 31, the specified image signal with the tag signal and displays them. Then the user operates similarly to the entry operation as the entry operation described above and completes the correction of tag signals.

Figure 3:
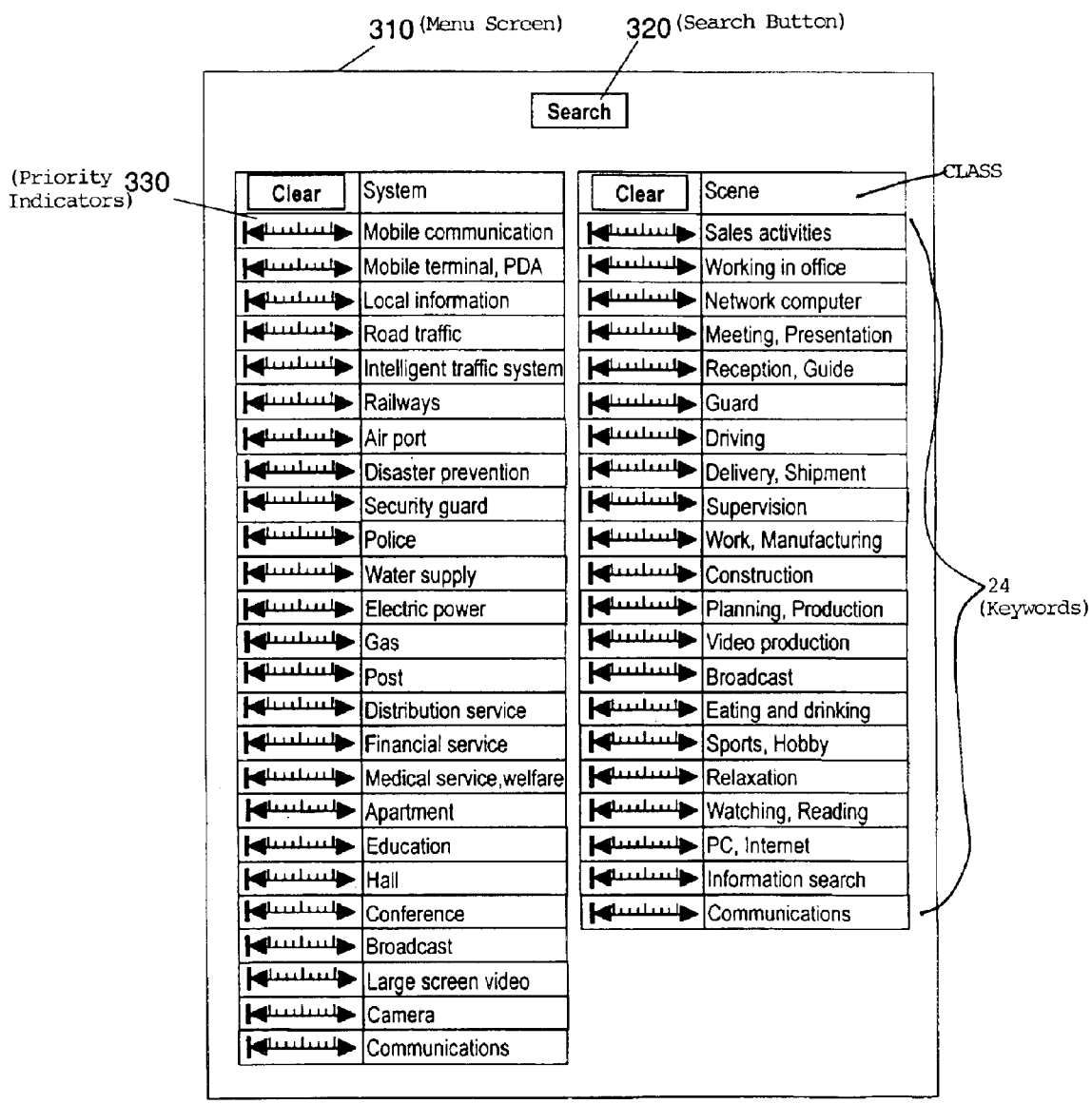
FIG. 3 shows a display of a menu entry section.

When searching an image, the user starts up the browser and selects the image retrieval page by clicking to start up menu entry section 4. When menu entry section 4 comes up, menu 310 shown in FIG. 3 appears.

Menu 310 contains a long list of keywords, indicators 330 graduated in multi level by which the importance of each keyword is indicated, and a pair of buttons for each keyword: one for increasing the level of the degree of the importance, the other for decreasing it. The user can set the degree of importance (e.g. assigning a priority) for each keyword: the degree of importance for a keyword is increased by clicking the level-up button on the right side to move the pointer of each indicator 330, while it is decreased by clicking the level-down button on the left side. Through such operation, the user enters a retrieval request signal to search a desired image then clicks on searching button 320. In response to clicking menu, menu entry section 4 sends the entered retrieval request signal to rating section 33.

In the embodiment, suppose that retrieval request signal "C" has "Nc" classes and class "c" has "Kc" keywords. In this case, signal "C" can be expressed "Nc" vectors. Each vector of signal "C" is expressed in "Kc"-dimensional vector, where suppose that the component corresponding to the keyword specified a selection criteria, i.e., the "j"th keyword in class "c", is set to "q (c, j)" as the value indicated by the indicator, the rest of the components are set to 0. For example:

$$C(c=1)=(0, 0, q(1, 3), 0, \ldots, 0, q(1, Kc))$$

$$C(c=2)=(q(2, 1), 0, 1, 0, \ldots, 0, 0)$$

. . .

$$C(c=Nc)=(0, 0, 0, q(Nc, 4), 0, \ldots, 0, 0)$$

In the embodiment, it is effective such that the value "q (c, j)" accepts 0 or positive values. In addition to 0 and positive values, it is effective such that the value "q (c, j)" further accepts negative values, which clearly indicates a negative meaning against the importance for a keyword.

Received retrieval request signal "C", rating section 33 sequentially reads electronic image signal "Im" and tag signal "Tm", which are addressable by number "m", and evaluates necessity signal "Nm" for each vector of tag signal "Tm".

According to the embodiment, if there are few non-zero values in each component of request signal "C", the necessity signal of the image signal in which there are few non-zero values in tag signal's component is increased. On the other hand, if there are many non-zero values in each component of request signal "C", the necessity signal of the image signal in which there are many non-zero values in tag signal's component is increased. The definition is based on a tendency described below.

For example, assuming that the illustration, in which a doctor's upper body is sketched, is the one to be retrieved, the tag signal would be tagged to the keyword "doctor" only. On the other hand, when the illustration, in which many strollers in the park or many stores on the street, is desired, plural keywords, such as "homemaker", "children", and "shopping mall", are expected to have tag signals simultaneously.

In the embodiment, the necessity signal is employed such that the keywords belong to the same class are ORed, while the keywords between different classes are ANDed, where the AND and OR are logical operators.

Using tag signal "Tm" and retrieval request signal "C", necessity signal "TNm" for an electronic image signal is calculated by the expression below:

$$TNm=Nm(1)*Nm(2)* \ldots *Nm(Nc).$$

"Nm (c)" indicates the degree of necessity for class "c" calculated by the expression below:

$$Nm(c)=0.5*(1+tanh((\text{length }(c)-\text{offset})/\text{defuse})*(tanh(\text{score }(c)/\text{length }(c))+1)+0.5*(1-tanh ((\text{length }(c)-\text{offset})/\text{defuse})*(tanh (\text{score }(c)/\text{length }(c)*\text{imagelength }(m, c))+1)$$

Where,

"imagelength (c)" is determined by adding small numbers to the sum of each component of class "c" vector "Tm (c)" in tag signals in order to avoid the occurrence of division by 0;

"length (c)" is determined by adding small numbers to the number of non-zero component of class "c" 's vector "C (c)" in retrieval request signal "C" in order to avoid the occurrence of division by 0;

"score (c)" is the inner product of class "c"'s vector "Tm (c)" in tag signal "Tm" and, class "c" 's vector "C (c)" in retrieval request signal "C"; and both of "offset" and "defuse" are parameters.

The expression is made of two terms to evaluate the degree of necessity of the electronic image signal, that is:

1) the first term in which the electronic image signal with more tags has a higher degree of necessity.

2) the second term in which the electronic image signal with fewer tags has a higher degree of necessity.

Which term is mainly used for the calculation in the expression depends on the number of non-zero components of the retrieval request signal with reference to the value of "offset", and the value of "defuse". In more detail, the contributions of the first term and second term depends on whether the number of non-zero components of the retrieval request signal is larger or smaller than the value of "offset". When number of non-zero components is close to the value of "offset", the degrees of contribution to the calculation from the two terms above are determined by the value of "defuse". Then, which terms above mainly contribute to the calculation changes with rapidity determined by the value of "defuse" in the neighborhood of the point that the number of no-zero components equals the value of "offset", which is the turning point of the change.

In the embodiment, it is preferable to have the value of "offset" ranging from 3 to 6, and the value of "defuse" ranging from 2 to 4.

In addition, it is effective that different classes may have different "offset"s and "defuse"s.

It is also effective that necessity signal "TNm" is the sum of necessity signal "Nm (c)" of each class, where each "Nm (c)" is modified by assigning a weight prior to being summed. When employing this way, it is preferable to assign more weights to an important class in the search.

Rating section 33 sends number "m" which addresses an electronic image signal and, necessity signal "TNm" corresponding to the image signal to sorter 34. Received these signals, sorter 34 generates an output signal in which the image signals are sorted in order of decreasing the rating of the necessity signal "TNm", then transmits the output signal to image output section 5. In the embodiment, the output signal is a Hyper Text Markup Language (HTML)-written source. Received the output signal, image output section 5 displays it on the screen.

As for the calculation of the degree of necessity, following ways are also available for good results.

i) calculating the entered tags with the class neglected;

ii) calculating the entered number of selection criteria with the class neglected; and iii) calculation in which the rating of a selection criteria, i.e., the indicator reading, is used to calculate the degree of necessity.

The notable point of the embodiment is in that a tendency often observed in tagging to images is used for the calculation of the degree of necessity. For example, assuming that an illustration is the desired one, in which a doctor's upper body is sketched, the tag signal would be tagged to the keyword "doctor" only. On the other hand, when the illustration, in which many strollers in the park or many stores on the street, is desired, plural keywords, such as "homemaker", "children", and "shopping mall", are expected to have tag signals simultaneously.

The necessity calculation is not limited to the way described above as long as such tendency is effectively used.

Although the explanation using the apparatus shown in FIG. 1 is given above, it is not limited to, as long as a similar way is employed, to obtain good results.

As described above, the present invention:

1) provides multi-leveled necessity entry for keywords in the menu;

2) evaluates the user's necessity rating for an image based on at least the retrieval request inputs and the number of the inputs prior to the search process; then 3) outputs the retrieved images in order of precedence.

Through this process, much-needed images can be offered users, according to the degree of necessity.

In other words, it enables to provide an improved human-computer interface that searches much-needed images based on the multi-leveled retrieval request entered by users and outputs the retrieved images in order of precedence.

What is claimed is:

1. A method of retrieving an image from at least one of an information-storage medium and an information network, said method comprising:

a) setting a retrieval request containing a degree of importance for a plurality of keywords by assigning a degree of importance to each keyword;

b) calculating a necessity signal for an image based on the retrieval request and a number of said plurality of keywords, each of said plurality of keywords being tagged to the image; and c) searching for the image from at least one of an information-storage medium and an information network and displaying the image, based on the necessity signal.

2. The method of retrieving an image as defined in claim 1, wherein each keyword is classified into a class and each class comprises a plurality of keywords.

3. The method of retrieving an image as defined in claim 1, wherein the image is displayed in order of priority of the degree of importance.

4. An apparatus for retrieving an image from at least one of an information-storage medium and an information network, said apparatus comprising:

a) a menu entry section that allows an user to set a retrieval request containing a degree of importance for a plurality of keywords by assigning a degree of importance to each keyword;

b) a retrieval section calculating a necessity signal based on the retrieval request and a number of said plurality of keywords, each of said plurality of keywords being tagged to the image and serching for the image from at least one of an information-storage medium and an information network based on the necessity signal; and c) a display section displaying the image output from the retrieval section according to the necessity signal.

5. The apparatus for retrieving an image as defined in claim 4, wherein each keyword is classified into a class and each class comprises a plurality of keywords.

6. The apparatus for retrieving an image as defined in claim 4, wherein the image is displayed in order of priority of the degree of importance.

7. The method of retrieving an image as defined in claim 2, wherein the degree of importance of the image is evaluated according to a degree of necessity by each class for the image.

8. The apparatus for retrieving an image as defined in claim 5, wherein the degree of importance of the image is evaluated according to a degree of necessity by each class for the image.

9. The method for retrieving an image as defined in claim 7, wherein:

the degree of importance by each class is obtained depending on i) a first value having a larger value as a number of the tags tagged to the image increases, ii) a second value having a larger value as a number of the tags tagged to the image decreases, and contributions of the first value and the second value to the degree of importance by each class are determined by a number of non-zero components of a retrieval request signal by each class.

10. The apparatus for retrieving an image as defined in claim 8, wherein:

the degree of importance by each class is obtained depending on i) a first value having larger value as a number of the tags tagged to the image increases, ii) a second value having a larger value as a number of the tags tagged to the image decreases, and contributions of the first value and the second value to the degree of importance by each class are determined by a number of non-zero components of a retrieval request signal by each class.

11. The method for retrieving an image as defined in claim 9, wherein:

when the number of the non-zero value is larger than a first predetermined value, the first value mainly contributes to the degree of importance by each class;

when the number of the non-zero value is smaller than the first predetermined value, the second value mainly contributes to the degree of importance by each class; and which of the first value and the second value mainly contributes to the degree of importance by each class changes with rapidity determined by a second predetermined value in a neighborhood of a point that the number of no-zero components equals the first value.

12. The apparatus for retrieving an image as defined in claim 10, wherein when the number of the non-zero value is larger than a first predetermined value, the first value mainly contributes to the degree of importance by each class;

when the number of the non-zero value is smaller than the first predetermined value, the second value mainly contributes to the degree of importance by each class; and which of the first value and the second value mainly contributes to the degree of importance by each class changes with rapidity determined by a second predetermined value in a neighborhood of a point that the number of no-zero components equals the first value.

13. The method of retrieving an image as defined in claim 2, wherein the image is displayed in order of priority of the degree of importance of the image.

14. The apparatus for retrieving an image as defined in claim 5, wherein the image is displayed in order of priority of the degree of importance of the image.

* * * * *